United States Patent [19]

Föhl

[11] Patent Number: 5,143,403
[45] Date of Patent: Sep. 1, 1992

[54] SAFETY MECHANISM FOR A RESTRAINT SYSTEM IN VEHICLES

[75] Inventor: Artur Föhl, Schorndorf, Fed. Rep. of Germany

[73] Assignee: TRW Repa GmbH, Alfdorf, Fed. Rep. of Germany

[21] Appl. No.: 698,659

[22] Filed: May 10, 1991

[30] Foreign Application Priority Data

May 11, 1990 [EP] European Pat. Off. ........ 90108887.2

[51] Int. Cl.$^5$ ...................... B60R 22/36; H01H 35/02
[52] U.S. Cl. .................................. 280/806; 280/734; 297/480; 242/107.4 A; 200/61.45 R
[58] Field of Search .......... 280/806, 734, 735; 297/480; 180/282; 242/107.4 A; 200/61.45 R, 61.53; 73/513, 493

[56] References Cited

U.S. PATENT DOCUMENTS

| | | | |
|---|---|---|---|
| 2,986,615 | 5/1961 | Hardway | 73/514 |
| 4,244,600 | 1/1981 | Takada | 242/107.4 A |
| 4,321,438 | 3/1982 | Emenegger | 200/61.45 R |
| 4,932,722 | 6/1990 | Motozawa | 297/480 |
| 4,955,638 | 9/1990 | Kinoshita et al. | 280/806 |
| 5,039,125 | 8/1991 | Buma et al. | 280/734 |

Primary Examiner—Charles A. Marmor
Assistant Examiner—Paul Dickson
Attorney, Agent, or Firm—Tarolli, Sundheim & Covell

[57] ABSTRACT

The mechanical sensor of a pretensioner in a safety belt restraining system is secured against unintentional release in the unassembled state by a pin which engages a vehicle-sensitive inertia mass and which blocks movement of the inertia mass. The pin is connected via a cable to a rotatable member which is received in a bearing housing. The rotatable member has the form of an annular disc with a central bore through which a mounting screw can be inserted. On tightening the mounting screw the rotatable member is also turned so that via the pulling cable the pin is withdrawn and the securing of the inertia mass is cancelled.

23 Claims, 4 Drawing Sheets

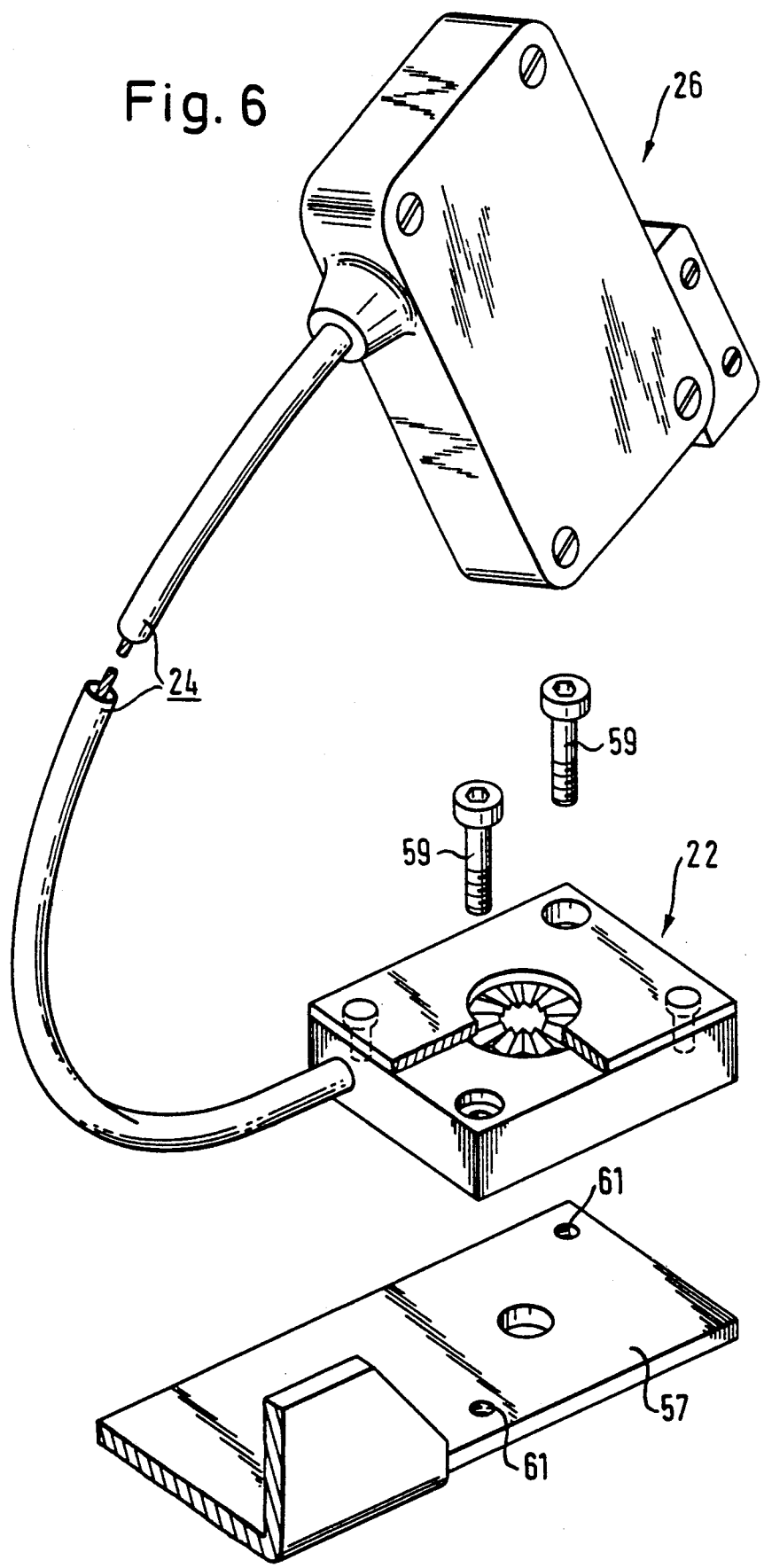

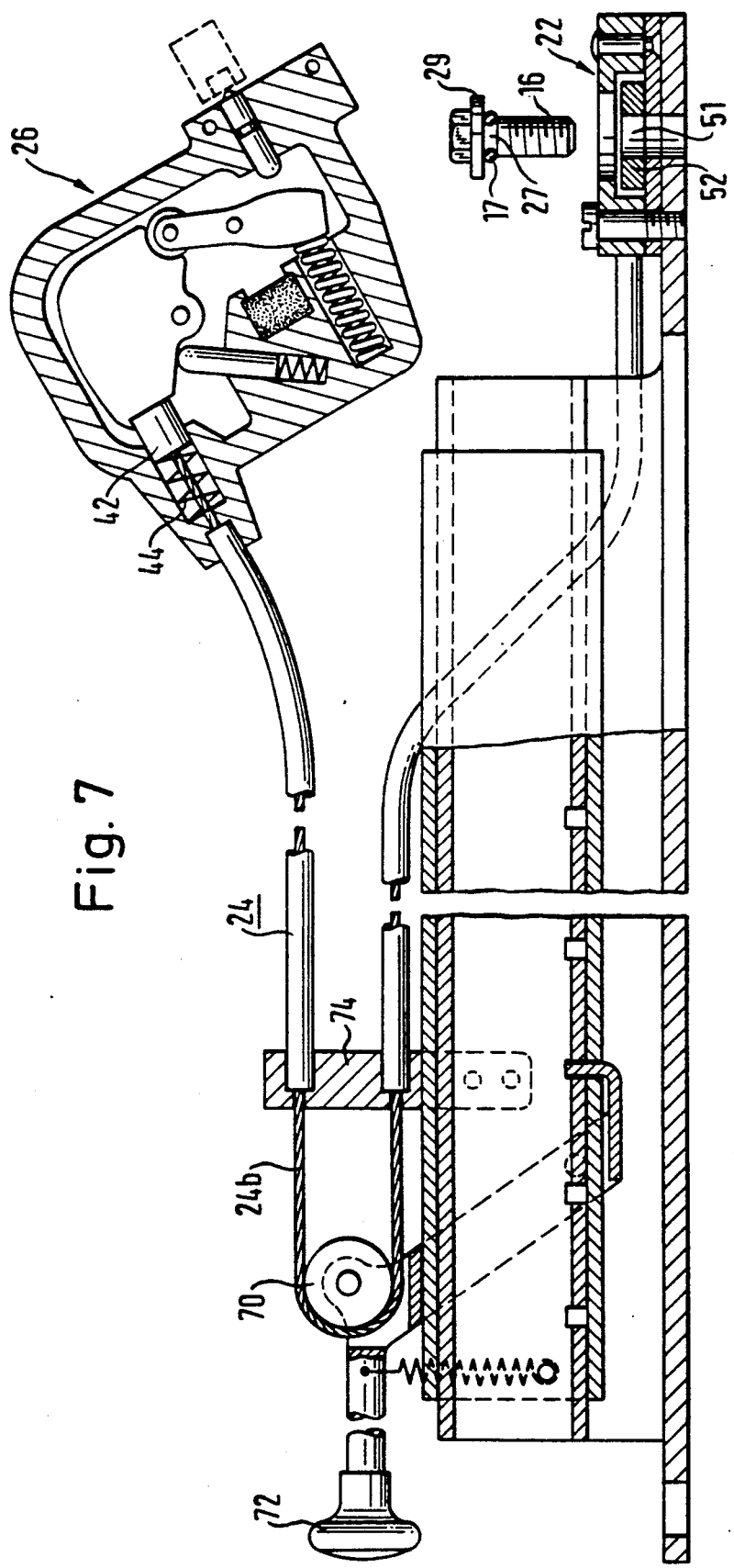
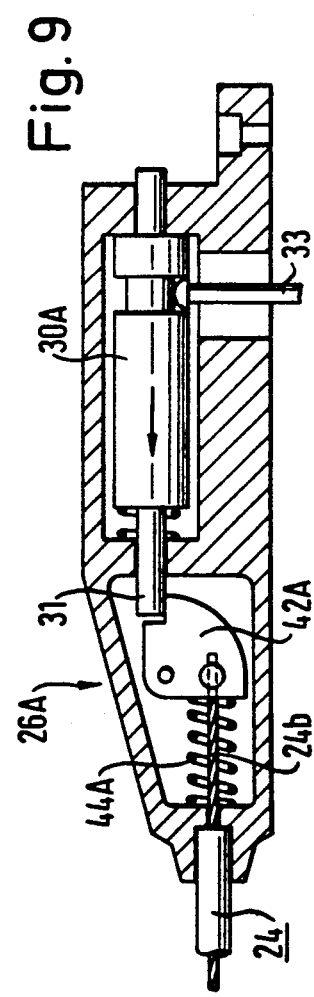

SAFETY MECHANISM FOR A RESTRAINT SYSTEM IN VEHICLES

BACKGROUND OF THE INVENTION

1. Field of the Invention

The invention relates to a safety mechanism for a pretensioner in a safety belt restraining system or for gas bag restraining systems in vehicles.

2. Description of the Prior Art

In mechanical or pyrotechnical pretensioners which are integrated into a vehicle seat, the complete vehicle seat with pretensioner can be constructed as a preassembled module which as such is installed in the vehicle. The mechanical drive mechanism of such a pretensioner system is equipped with a vehicle-sensitive mass responsive to decelerations. The trigger threshold depends on the vehicle type. In the handling and assembly of the finished vehicle seat and also of a separate pretensioner impacts can occur which in an extreme case exceed the trigger threshold and therefore lead to activation of the pretensioner drive. The pretensioner is then no longer of any use.

SUMMARY OF THE INVENTION

To avoid unintentional activation of the pretensioner, a control means is used which remains in an inhibiting state and prevents activation of the pretensioner until the vehicle seat is mounted in the vehicle.

The invention provides a simple and reliable safety mechanism offering flexibility in the selection of assembly location.

According to the invention, an inhibiting element is connected to a rotatably mounted component which is rotatably driven by a mounted screw and jointly rotated with this screw on tightening thereof. The rotary movement of this component effects a displacement of the inhibiting element to an inhibiting position in which operation of the pretensioner or gas bag system is precluded. Almost any assembly operation, whether in the fitting of the complete seat or the assembly of individual components of the pretensioner means, requires the use of mounting screws. In the safety mechanism according to the invention the control means can be associated with any desired mounting or assembly screw. Prior to the assembly the safety mechanism remains safe in that the inhibiting element is biased by spring force into its inhibiting position. On assembly of the complete vehicle seat with a pretensioner or of the separate pretensioner the rotatably mounted component is associated with a suitable mounting screw. On tightening said mounted screw the rotatable component is engaged and entrained by frictional engagement or interference engagement. The rotational movement of the rotatable component is converted preferably via a sheathed cable engaging the periphery of the component into a translational movement which is transmitted to the inhibiting element. The inhibiting element is formed in particular as an axially movable pin, the end of which remote from the sheathed cable projects into the interior of a housing and engages a vehicle-sensitive inertia mass to secure the latter in its readiness position.

BRIEF DESCRIPTION OF THE DRAWINGS

Further features and advantages of the invention will be apparent from the description of a preferred embodiment of the invention and from the drawings to which reference is made and in which:

FIG. 6 shows a further constructional variant;

FIG. 7 shows an embodiment with safety securing on actuation of a hand grip for unlocking the seat;

FIG. 9 shows a constructional variant of a mechanical sensor.

DESCRIPTION OF THE PREFERRED EMBODIMENTS

Figure 1:
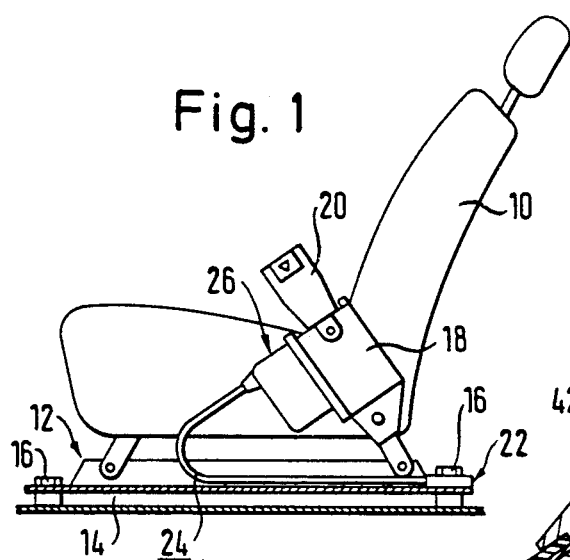
FIG. 1 shows a schematic overall view of a vehicle seat with integrated pretensioner.

The vehicle seat 10 shown in FIG. 1 is mounted by means of its seat frame 12 on rails 14 which are anchored by means of mounting screws 16 to the vehicle floor. On the one side of the vehicle seat 10 a pyrotechnical pretensioner 18 is disposed which in the event of actuation moves a belt lock 20 inclined in the direction of the vehicle floor to take the belt slack out of the belt system. Associated with one of the mounting screws shown in FIG. 1 is a control means 22 which is connected via a sheathed cable 24 to a mechanical vehicle-sensitive sensor 26.

Figure 2:
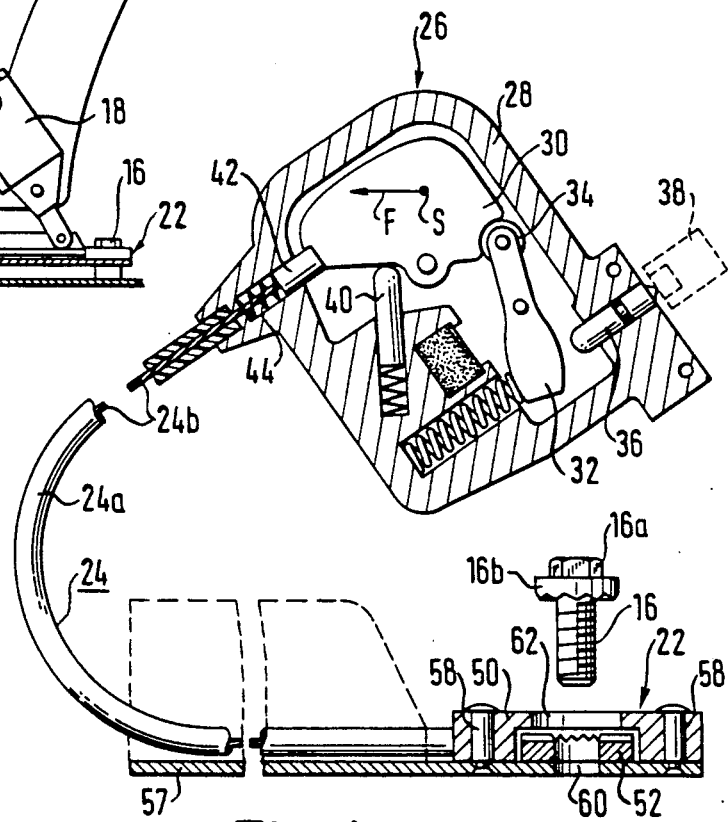
FIG. 2 shows a schematic view, partially in section, of a drive mechanism with control means.

Said mechanical sensor is shown in FIG. 2 to a larger scale in sectional view. A vehicle-sensitive inertia mass 30 is pivotally mounted in a housing 28. A spring-loaded impact piece 32 in the form of a pivotally mounted two-arm lever bears with a roller 34 in a concave recess of the inertia mass 30. In the readiness condition shown in FIG. 2 the one arm of the impact piece 32 lies opposite and spaced from a firing pin 36 displaceably mounted in a bore of the housing 28. The firing pin 36 in turn lies with its outer end opposite the impact igniter of a pyrotechnical charge 38 which is only schematically indicated in FIG. 2 and is part of a pyrotechnical pretensioner (not illustrated). A spring-loaded pressure pin 40 bears on a surface of the inertia mass 30 and together with the control cam or curve formed by the concave recess of the inertia mass 30 defines the trigger threshold at which the inertia mass 30 under the action of deceleration forces applied on its center S of gravity is pivoted in the direction of an arrow F anticlockwise to release the impact piece 32 so that the latter, under the action of the spring loading, is accelerated towards the firing pin 36 until it strikes the latter and drives it into the impact igniter.

In a further bore of the housing 28 an inhibiting element in the form of a pin 42 is mounted axially displaceably. Said pin 42 projects with its one end into the interior of the housing 28 and engages a step-like cutout of the inertia mass 30 to secure the latter in its readiness position shown in FIG. 2. The pin 42 is biased by a pressure spring 44 into said blocking position, said spring being supported between the outer end of the pin 42 and the bottom of the housing bore receiving the latter in axially displaceable manner. Said housing bore continues beyond a constriction in a coaxial outer bore portion into which the one end of the outer sheath 24a of the sheathed cable 24 is inserted. The pulling cable 24b of the sheathed cable 24 is secured to the outer end of the pin 42.

Figure 3:
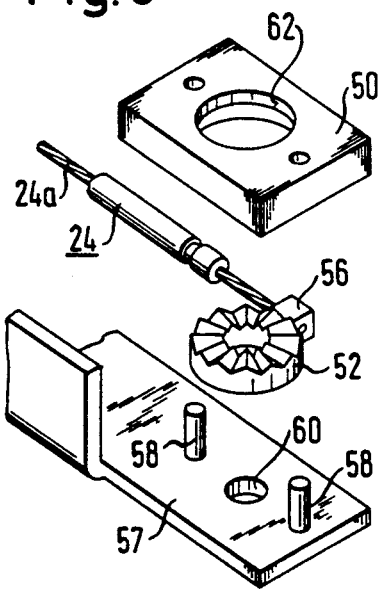
FIG. 3 is an exploded view of the control means.

The control means associated with the mounting screw 16 is connected to the mechanical sensor 26 via the sheathed cable 24. It consists of a plate-shaped bearing housing 50 and a rotatable member 52 in the form of a ring disc which is received with play in an accommodation space 54 cut out on one side of the housing 50. The member 52 comprises a radial lug 56 which is provided with a tangential bore into which the associated end of the pulling cable 24b is pressed. The accommodation space 54 forms two stops 54a, 54b between which the radial lug 56 of the member 52 is rotatable between limits. As can be seen from FIG. 3, the housing 50 is secured to a base plate 56 by means of two bolts or rivets 58. The base plate 56 closes the accommodation space 54 but is provided with a through bore 60 for a mounting screw 16.

Figure 4:
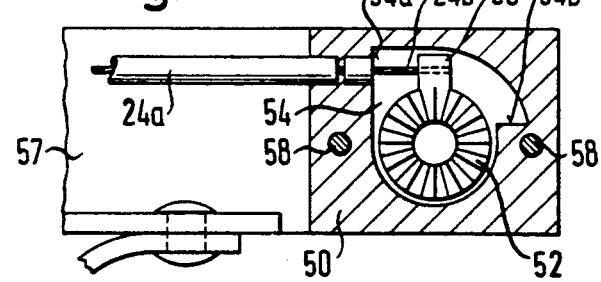
FIG. 4 is a side elevation of the control means.

The state shown in FIG. 4 is a readiness state in which the member 52 assumes an intermediate position between the stops 54a, 54b. Thus, in this position the radial lug 56 maintains a certain angular distance from the stop 54a. For depending on the lay of the sheathed cable 24 a greater or lesser shortening of the end portion of the pulling cable 24b between the stop 54a and the radial lug 56 can occur. Due to the distance present in the readiness state between the stop 54a and the radial lug 56, even with pronounced shortening of the end portion of the pulling cable 24b lying therebetween no tension can be exerted on the pin 42 so that the securing of the safety mass 30 is ensured under all circumstances. On the other hand, the stop 54b is an adequate distance away from the stop 54a to permit a rotational movement of the member 52 by which the pin 42 is withdrawn from the path of movement of the inertia mass 30 so that the securing is cancelled by rotation of the member 52 towards the stop 54b. This rotation of the member 52 is generated on assembly in that the mounting screw 16 at a radial contact shoulder 16b adjacent its head 16a comes into frictional or form-locking engagement with the opposite face of the member 52 so that on tightening of the mounting screw 16 the member 52 is also turned until the radial lug 56 strikes the stop 54b. To improve the force locking between the mounting screw 16 and the member 52 the opposing faces of said elements may be provided with a form-locking configuration which is indicated by a knurling in the illustration in the drawings of FIGS. 3 and 4. In the variant of the mounting screw likewise shown in FIG. 3 in section, said screw is provided at the lower side of its shoulder 16b with an angular groove for receiving an O-ring 17 which by friction assists the entraining effect with respect to the member 52.

The plate-shaped bearing housing 50 is provided on its side remote from the mounting plate 56 with an opening 62 for the passage of the screw head 16a and its widened contact shoulder 16b. On fitting the vehicle seat 10 the control means 22 is associated with a suitable mounting screw 16 in a manner similar to a washer. It may be constructed as detached unit or alternatively fixedly associated with a certain assembly point in that the base plate 56 is secured at a suitable point to the seat anchoring or is formed directly by part of the seat anchoring. In the latter case, the bearing housing 50, as shown in FIG. 1, is secured directly to the seat anchoring which then forms the mounting plate 56.

Figure 5:
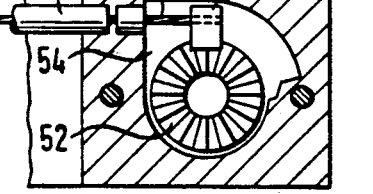
FIG. 5 is a partial view of a constructional variant of the control means shown in FIG. 4.

In the embodiment shown in FIG. 5 the end of the pulling cable 24b introduced into the bearing housing 50 is provided with a pressed-on end piece 63 which may be cylindrical or cubic. Said end piece 63 engages into a correspondingly formed cutout at the periphery of the annular disc-shaped rotatable component 52. In its effect, said end piece 63 is comparable to the radial lug 56 of the embodiment shown in FIG. 4. It is held by the inner wall of the accommodation space 54 in engagement with the cutout at the outer periphery of the component 52.

As shown in FIGS. 4 and 5, the rotational angle between the stops 54a and 54b is somewhat greater than 90°. Depending on the use and constructional configuration, this rotational angle may be made larger or smaller.

In the embodiment shown in FIG. 2 the mechanical sensor 26 is equipped with a pivotal inertia mass 30. Constructions are also possible with a translationally displaceable inertia mass. The details of the mechanical sensor will not be discussed here because its structure and mode of operation is independent of the function of the control means 22. Also, instead of the pin 42 a blocking element of different type may be employed as long as it effects a securing of the inertia mass of the vehicle-sensitive sensor.

Furthermore, it is readily apparent that the drive mechanism can be associated equally well with the pretensioner 18 shown in FIG. 1 and with a gas bag restraining system.

Use of the drive mechanism according to the invention ensures that activation of the pretensioner 18 or a (not illustrated) gas bag restraining system is not possible until an assembly operation has been carried out in which a mounting screw 16 is inserted through the opening 62 of the bearing housing 50 and through the center bore of the annular disc-shaped component 52 and tightened, said component 52 being entrained in the rotation up to the limit against the stop 54b. This operation cancels the securing of the vehicle-sensitive inertia mass 30 of the sensor 26. On removal of the vehicle seat, for example for repair purposes, the respective mounting screw 16 is loosened so that the annular disc-shaped component 52 also becomes free and under the action of the spring 44 the pin 42 can again be moved into its blocking position. The securing state is thus automatically established by loosening the mounting screw 16.

In the embodiment shown in FIG. 6 the control means 22 forms a separate unit which can be associated at any suitable point with a mounting screw 16. It is secured by means of two securing screws 59 to the upper side of a component 57 which is anchored by means of the mounting screw 16 to the vehicle floor and has two suitably arranged threaded bores for the securing screws 59.

Figure 8:
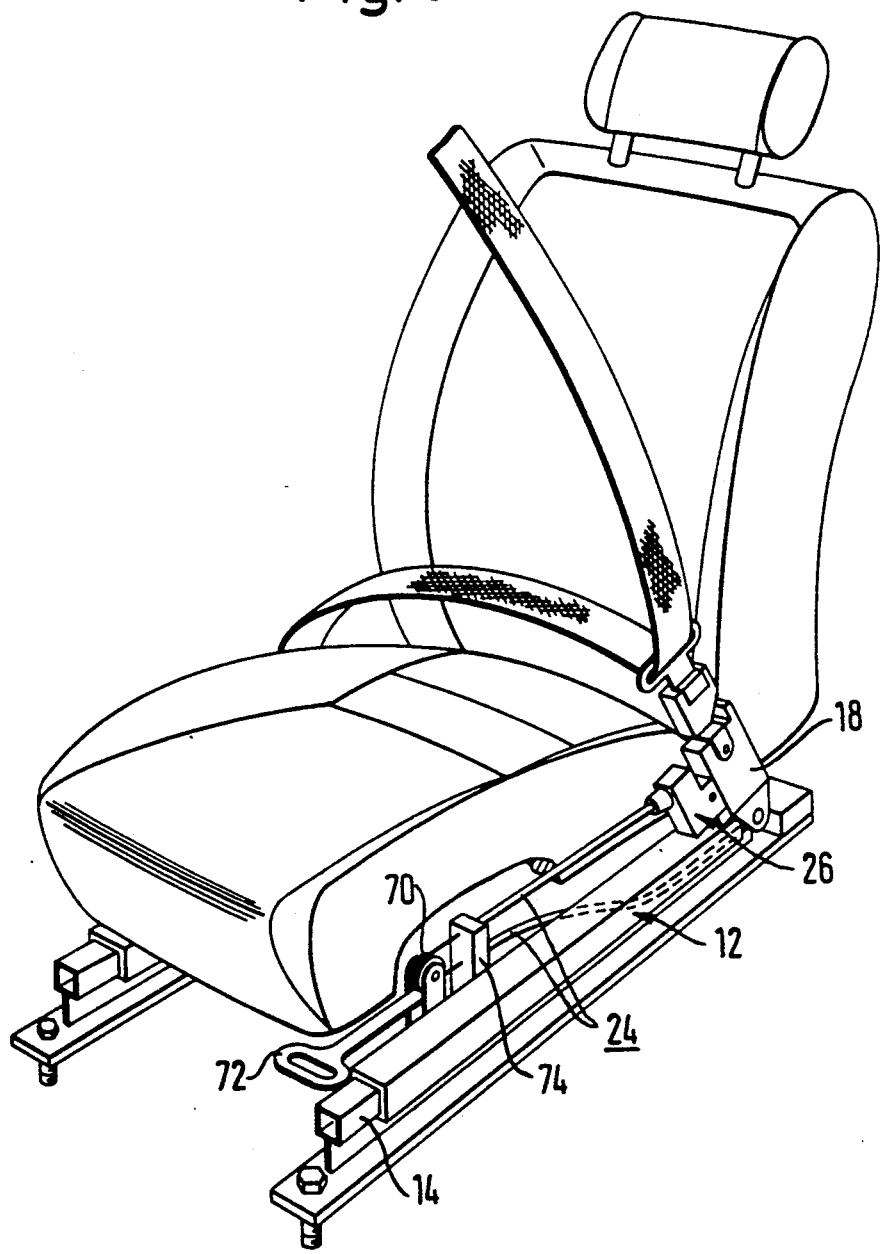
FIG. 8 is perspective view of a vehicle seat with integrated tightening means.

In the embodiment shown in FIG. 7 the pulling cable 24b of the sheathed cable 24 is led via a deflection pulley 70 which is rotatably mounted on a hand grip 72 for releasing the seat locking of a vehicle seat. The vehicle seat with integrated tightening means 18 and hand grip 72 for actuating the seat unlocking is shown schematically and in perspective in FIG. 8. To ensure that the pulling cable 24 can run over the deflection pulley 70, the outer sheath of the sheathed cable 24 is interrupted. The respective ends of the outer sheath of the sheathed cable 24 are supported in a strut 74 which is secured to the seat frame 12. The control means 22 is constructed in fundamentally the same manner as in the embodiments described above.

FIG. 7 shows the arrangement in the state before insertion and tightening of the mounting screw 26. In this state the pulling cable 24b is relaxed so that the pin 42 of the sensor 26 is held in the inhibiting position by the pressure spring 44. On insertion and tightening of the mounting screw 26 the rotatable annular disc-shaped component 52 is turned clockwise, the pulling cable 24b thereby being tensioned and the pin 42 moved against the force of the spring 44 into the release position. If, however, the hand grip 72 is now actuated for releasing the seat locking, the deflection pulley 70 is shifted in the sense of relaxing the pulling cable 24b, i.e. towards the strut 74, so that the pulling cable 24b is relaxed. The pressure spring 44 therefore presses the pin 42 into the securing position. On each release of the seat detent engagement a securing of the sensor 26 therefore takes place automatically, so that any shocks occurring on seat adjustment cannot lead to activation of the tightening means.

FIG. 7 shows a peculiarity of the mounting screw 26: It is provided with a radial annular groove 27 in its shank adjacent its collar 29 and in said annular groove 27 an O-ring 17 is accommodated. The through bore 51 of the component 52 for the mounting screw 26 is dimensioned in its diameter so that the O-ring 17 can be pressed axially into said bore for establishing a frictional connection between the component 52 and the mounting screw 26 without preventing the lower side of the collar 29 from bearing on the upper side of the component 52.

A further configuration resides in that means preventing an unintentional loosening are associated with the mounting screw 26. For loosening of the mounting screw 26 could lead to the pin 42 moving into its blocking position under the action of the pressure spring 44.

FIG. 9 shows a possible embodiment of a vehicle-sensitive sensor 26A of which the inertia mass 30A is not pivotal but is mounted for translational displacement. In the secured position shown in FIG. 9 the translational displacement of the inertia mass 30A in the travelling direction (arrow) is prevented by a blocking plate 42A which is made segmental and is provided with a stepped recess into which the end of a bearing pin 31 attached coaxially to the inertia mass 30A engages. The pulling cable 24b of the sheathed cable 24 engages with suitable leverage on the blocking plate 42A. By a pressure spring 44A the blocking plate 42A is biased into its blocking position. On exertion of tension by means of the pulling cable against the action of the pressure spring 44A the blocking plate 42A is pivoted clockwise into its release position in which it frees the path for a movement of the inertia mass 30A in the travelling direction (arrow in FIG. 9). This displacement movement of the inertia mass 30A is transmitted via a lever 33, shown only partially and schematically, to a mechanism for activating a pretensioner.

What is claimed is:

1. A safety mechanism for a vehicle safety apparatus such as a pretensioner in a vehicle safety belt restraining system or a gas bag restraining system in a vehicle, the vehicle safety apparatus having a movable actuating member, said safety mechanism comprising:
   blocking means for blocking actuating movement of said actuating member;
   said blocking means including a blocking member connected by a sheathed cable to a rotatably mounted component rotatably driven by a mounting screw for said safety mechanism and jointly rotatable with said mounting screw on tightening thereof;
   rotational movement of said component moving said blocking member from a blocking position into a release position to enable actuating movement of said actuating member; and
   spring means for biasing said blocking member into its blocking position, said spring means, on loosening said mounting screw, automatically returning said blocking member to its blocking position.

2. A safety mechanism for a vehicle safety apparatus such as a pretensioner in a vehicle safety belt restraining system or a gas bag restraining system in a vehicle, the vehicle safety apparatus having a movable actuating member, said safety mechanism comprising:
   blocking means for blocking actuating movement of said actuating member;
   said blocking means including a blocking member connected to a rotatably mounted component rotatably driven by a mounting screw for said safety mechanism and jointly rotatable with said mounting screw on tightening thereof;
   rotational movement of said component moving said blocking member from a blocking position into a release position to enable actuating movement of said actuating member; and
   said mounting screw having a shank, said rotatably mounted component formed as an annular member extending around said shank of said mounting screw.

3. The safety mechanism according to claim 2, wherein said annular member is adapted to be coupled in rotation to the mounting screw by frictional or interference engagement between its surface facing a head portion of the mounting screw and the opposite surface of said head portion.

4. The safety mechanism according to claim 2, wherein said rotatably mounted component is rotatable to an extent limited by two stops.

5. The safety mechanism according to claim 4, wherein said rotatably mounted component assumes an intermediate position between the two stops prior to its rotation by the mounting screw.

6. The safety mechanism according to claim 1, wherein said sheathed cable has an inner pulling cable, one end of which engages the periphery of the rotatably mounted component.

7. The safety mechanism according to claim 6, wherein said end of the pulling cable is fixed in a tangential bore of a radial lug of the rotatably mounted component.

8. The safety mechanism according to claim 6, wherein said end of the pulling cable is provided with a pressed-on end piece which engages into a cutout at a periphery of the rotatably mounted component.

9. The safety mechanism according to claim 1, wherein said rotatably mounted component is received with clearance in a bearing housing which comprises an opening for the passage of a head portion of said mounting screw.

10. The safety mechanism according to claim 9, wherein said bearing housing is formed by a plate having a major side of which a bearing space for the rotatably mounted component is cut.

11. The safety mechanism according to claim 1, wherein said blocking member is an axially displaceable pin which in the blocking position engages with its inner end on a vehicle-sensitive inertia mass.

12. The safety mechanism according to claim 1, for a pretensioner integrated into a vehicle seat provided with a handle for unlocking the seat to permit its longitudinal adjustment, wherein actuation of said handle causes said blocking member to be moved to its blocking position.

13. The safety mechanism according to claim 12, wherein said sheathed cable has an inner pulling cable which is led about a deflection element mounted on the handle.

14. The safety mechanism according to claim 1, wherein said mounting screw is provided with an annular groove into which an O-ring is insertable for establishing a frictional connection between the mounting screw and the rotatably mounted component.

15. The safety mechanism according to claim 14, wherein said annular groove is cut radially out of the shank of the mounting screw and the O-ring is adapted to be pressed axially into a through bore of the rotatably mounted component for the mounting screw.

16. The safety mechanism according to claim 2, wherein said rotatably mounted component is rotatable between and to an extent limited by two stops.

17. The safety mechanism according to claim 16, wherein said rotatably mounted component is disposed in an intermediate position between said two stops prior to rotation of said component by said mounting screw.

18. The safety mechanism according to claim 2, wherein said rotatably mounted component is disposed with clearance in a bearing housing having an opening for the passage of a head portion of said mounting screw.

19. The safety mechanism according to claim 18, wherein said bearing housing comprises a plate having a major side surface including surface portions defining a bearing space for said rotatably mounted component.

20. The safety mechanism according to claim 2, wherein said blocking member comprises an axially displaceable pin which in said blocking position engages with its inner end on a vehicle-sensitive inertia mass.

21. The safety mechanism according to claim 2 for a pretensioner integrated into a vehicle seat provided with a handle for unlocking the seat to permit its longitudinal adjustment, wherein said blocking element is movable to its blocking position upon actuation of said handle.

22. The safety mechanism according to claim 2, wherein said mounting screw has an annular groove in which there is disposed an O-ring for establishing a frictional connection between said mounting screw and said rotatably mounted component.

23. The safety mechanism according to claim 22, wherein said annular groove is cut radially out of said shank of said mounting screw and said O-ring is pressed axially into a central opening of said rotatably mounted component.

* * * * *

UNITED STATES PATENT AND TRADEMARK OFFICE
CERTIFICATE OF CORRECTION

PATENT NO.   : 5,143,403
DATED        : September 1, 1992
INVENTOR(S)  : Artur Fohl It is certified that error appears in the above-identified patent and that said Letters Patent is hereby corrected as shown below:

Column 6, Line 37, Claim 4, change "2" to --1--.

Signed and Sealed this

Fifth Day of October, 1993

Attest:

BRUCE LEHMAN

Attesting Officer    Commissioner of Patents and Trademarks